United States Patent
Parikh

(10) Patent No.: US 9,496,963 B2
(45) Date of Patent: Nov. 15, 2016

(54) CURRENT-MODE DRIVER WITH BUILT-IN CONTINUOUS-TIME LINEAR EQUALIZATION

(71) Applicant: Fujitsu Limited, Kawasaki-shi (JP)

(72) Inventor: Samir Parikh, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/631,272

(22) Filed: Feb. 25, 2015

(65) Prior Publication Data

US 2016/0248518 A1    Aug. 25, 2016

(51) Int. Cl.
*H04B 10/58* (2013.01)
*H04B 10/50* (2013.01)
*H04L 25/03* (2006.01)

(52) U.S. Cl.
CPC ............ *H04B 10/58* (2013.01); *H04B 10/504* (2013.01); *H04L 25/03343* (2013.01)

(58) Field of Classification Search
CPC .. H04B 10/504; H04B 10/541; H04B 10/58; H04L 25/03006
See application file for complete search history.

(56) References Cited

U.S. PATENT DOCUMENTS

| 6,211,984 B1* | 4/2001 | Yoshida | H04B 10/58 375/296 |
|---|---|---|---|
| 9,231,704 B1* | 1/2016 | Zhou | H04B 10/504 |
| 2001/0048541 A1* | 12/2001 | Ishii | H04B 10/2507 398/201 |
| 2010/0266292 A1* | 10/2010 | Mouri | H04B 10/802 398/172 |
| 2011/0080199 A1* | 4/2011 | Yen | H03L 7/093 327/157 |

OTHER PUBLICATIONS

John F. Bulzacchelli, "A 10-Gb/s 5-Tap DFE/4-Tap FFE Transceiver in 90-nm CMOS Technology," IEEE Journal of Solid-State Circuits, vol. 41, No. 12, Dec. 2006 (16 pages).

* cited by examiner

*Primary Examiner* — David Payne
*Assistant Examiner* — Casey Kretzer
(74) *Attorney, Agent, or Firm* — Baker Botts L.L.P.

(57) ABSTRACT

According to one embodiment of the present disclosure, a current-mode driver with built-in CTLE provides signal correction for a transmitter. The current-mode driver includes a digital current source operable to use a data signal to produce a main current signal. The current-mode driver also includes a filtering circuit comprising a resistor and a capacitor. The filtering circuit is operable to receive a negative data signal and produce a filtered data signal. The filtering circuit may be tuned to produce a zero at a pole frequency in the filtered data signal that compensates for signal degradation caused by the optical transmitter. The current-mode driver also includes an analog current source coupled in parallel to the digital current source, wherein the analog current source is operable to generate a subtraction current signal proportional to the filtered data signal. The subtraction current signal combined with the main current signal are operable to drive the transmitter.

18 Claims, 3 Drawing Sheets

CURRENT-MODE DRIVER WITH BUILT-IN CONTINUOUS-TIME LINEAR EQUALIZATION

TECHNICAL FIELD

This disclosure relates generally to electronic communications and, more particularly, to an improved current-mode driver with built-in continuous-time linear equalization.

BACKGROUND

In electronic circuits, a current-mode driver may communicate electronic data signals at high transmission rates. Current-mode drivers are used in a variety of applications such as fiber optics, telecommunications, and other high-speed integrated systems. In general, a current-mode driver is used to transmit data ranging from a few hundred Mbps to tens of Gbps across a printed circuit board and/or optical fibers. As communication devices become faster and the demand for communication bandwidth increases, there is a corresponding desire to increase the speed and quality of connections between the components used in such devices. Optical transmitters such as vertical-cavity surface-emitting lasers (VCSELs) are typical light sources in high-speed optical links. A VCSEL-based optical communication link requires a VCSEL driver to modulate the drive signal of a VCSEL during the communication of signals.

SUMMARY

According to one embodiment of the present disclosure, a current-mode driver with built-in continuous-time linear equalization provides signal correction for a transmitter. The current-mode driver includes a digital current source operable to use a data signal to produce a main current signal. The current-mode driver also includes a filtering circuit comprising a resistor and a capacitor. The filtering circuit is operable to receive a negative data signal and produce a filtered data signal. The filtering circuit may be tuned to produce a zero at a pole frequency in the filtered data signal that compensates for signal degradation caused by the transmitter. The current-mode driver also includes an analog current source coupled in parallel to the digital current source, wherein the analog current source is operable to generate a subtraction current signal proportional to the filtered data signal. The subtraction current signal combined with the main current signal are operable to drive the transmitter.

In another embodiment, an apparatus includes a digital current source operable to use a data signal to produce a main current signal. The apparatus also includes a filtering circuit that receives a negative data signal and generates a filtered data signal according to characteristics of the resistor and capacitor. The apparatus may also include an analog current source coupled in parallel to the digital current source. The analog current source may be operable to generate a subtraction current signal based on the filtered data signal, the subtraction current signal combined with the main current signal operable to drive a transmitter.

Certain embodiments of the present disclosure may provide one or more technical advantages. A technical advantage of one embodiment is reduced power consumption of the current-mode driver. Typical circuits providing pre-emphasis or equalization such as feed-forward equalization circuits often rely on multiple current sources, which require more power to operate. By implementing pre-emphasis, which refers to using a current-mode driver with built-in CTLE, it is possible to reduce the amount of current sources required to increase signal quality in the high-speed data transmission system. By reducing the number of components required for signal correction, the current-mode driver becomes less expensive to manufacture. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Embodiments of the present disclosure and its advantages are best understood by referring to FIGS. 1-4, like numerals being used for like and corresponding parts of the various drawings.

Figure 1:
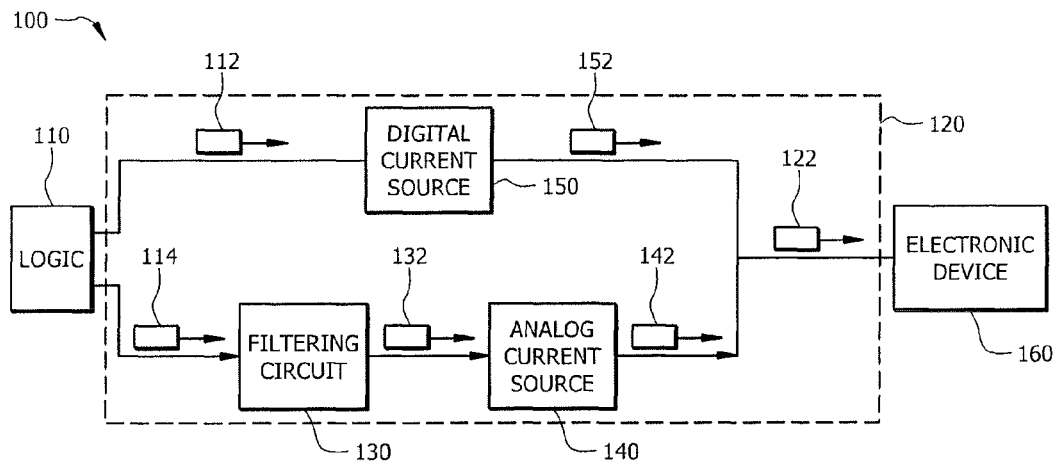
FIG. 1 is a block diagram showing an example embodiment of a data transmission system implementing a current-mode driver with built-in continuous-time linear equalization (CTLE)

FIG. 1 is a block diagram showing an example embodiment of a data transmission system 100 implementing a current-mode driver 120 with built-in continuous-time linear equalization (CTLE). Data transmission system 100 includes logic 110 coupled to current-mode driver 120 and electronic device 160. Current-mode driver 120 comprises filtering circuit 130, analog current source 140, and digital current source 150. In the illustrated embodiment, the output of current-mode driver 120 is coupled to electronic device 160.

In certain embodiments, data transmission system 100 is configured to process high-speed data streams (i.e., data bit rates greater than 1 Gbps). For example, digital current source 150 may receive data signal 112 having a data rate of 25 Gbps from logic 110. Digital current source 150 may produce a main current signal 152 based on data signal 112. Filtering circuit 130 may receive a negative data signal 114. In some embodiments negative data signal 114 is the negative version of data signal 112. Filtering circuit 130 may filter negative data signal 114, producing a filtered data signal 132. Filtered data signal 132 may be used by analog current source 140 to produce a subtraction current signal 142. Main current signal 152 and subtraction current signal 142 may be combined to produce compensation signal 122 that is capable of driving electronic device 160. For example, electronic device 160 may be an optical transmitter modulated by compensation signal 122. Accordingly, current-mode driver 120 may provide transmit equalization to data signal 112 so that compensation signal 122 may overcome signal degradation and attenuation caused by data transmission system 100.

Logic 110 represents any device capable of producing data signal 112 and negative data signal 114. In some embodiments, negative data signal 114 may be generated by a separate negating circuit. Logic 110 may be encoded in one or more non-transitory, tangible media, such as a computer readable medium, and may perform operations when executed by a computer. Logic 110 may be implemented as a processor or a microcontroller.

Data signal 112 may be sinusoidal, square, triangular, or any other appropriate voltage or current signal. The frequency of data signal 112 may be application dependent and vary based on electronic device 160. For example, if electronic device 160 is an optical transmitter, logic 110 may produce data signal 112 for transmission at high frequencies (e.g. 1-50 Gbps). As described in greater detail below, data signal 112 may be a series of square-wave-type pulses with vertical rising and falling edges and a flat frequency response.

In certain embodiments, data transmission system 100 is implemented on a printed circuit board (PCB). The PCB may be single sided, double sided, or multi-layer. In some embodiments, the PCB is a standard FR-4 PCB. Traces of conductive material disposed on the PCB may couple the components of data transmission system 100. For example, traces may couple logic 110 to current-mode driver 120 and electronic device 160. PCB traces may be made of fine lines of metal or other conductive material. As an example, the conductive material of the PCB traces may be copper or copper-based and have a width of approximately 100 um or less. As another example, the conductive material of the traces may be silver or silver-based and have a width of approximately 100 urn or less. Although this disclosure describes particular traces made of particular materials with particular widths, this disclosure contemplates any suitable tracks made of any suitable materials with any suitable widths.

Communication channels such as PCB traces, vias, connectors, backplanes and fiber optics may produce signal degradation and attenuation in data signal 112. At high frequencies, the length and width of the PCB traces may introduce capacitive and resistive effects on data signal 112. Electronic device 160 may also introduce bandwidth limitations such as parasitic capacitances that affect the transmission of data signal 112. These effects may lead to changes in the rise time and amplitude of data signal 112 resulting in inter-symbol interference (ISI). ISI may cause bits in data signal 112 to stretch or become distorted. These distortions may cause data signal 112 to have pulses with sloped leading and trailing edges and unsmooth frequency responses, leading to operational defects in electronic device 160. For example, electronic device 160 may be an optical transmitter such as a vertical-cavity surface-emitting laser (VCSEL). The ISI created in data signal 112 may cause the VCSEL to transmit erroneously or not at all. To improve the performance of electronic device 160, current-mode driver 120 may perform pre-emphasis on data signal 112. Pre-emphasis, also called transmit equalization, refers to the process of reversing or preempting the distortion incurred by a signal transmitted through a communication channel.

To overcome the ISI created by the PCB and electronic device 160, current-mode driver 120 may compensate for the future degradation of data signal 112.

Current-mode driver 120 comprises digital current source 150, filtering circuit 130, and analog current source 140. Digital current source 150 may use data signal 112 to determine when to generate main current signal 152. For example, when data signal 112 is high (e.g., +5v), digital current source 150 may generate main current signal 152. When data signal 112 is low (e.g., 0v), digital current source 150 may not generate any current signal. Filtering circuit 130 may receive negative data signal 114 and filter it according to characteristics of the resistor and capacitor. During the filtering process, filtering circuit 130 may alter negative data signal 114 to create filtered data signal 132 that compensates for future signal attenuation and degradation. Analog current source 140 may then produce substitution current signal 142 that is proportional to filtered data signal 132. Main current signal 152 and substitution current signal 142 may combine to generate compensation signal 122 that is capable of driving electronic device 160. Accordingly, equalization by current-mode driver 120 may provide pre-emphasis of the high frequency leading edge of bit transitions in data signal 112.

Electronic device 160 may be any suitable device capable of using compensation signal 122. In certain embodiments, electronic device 160 is an optical transmitter capable of being used in fiber optic communications, bar code readers, laser pointers, optical device reading and writing (CD/DVD/Blu-ray), laser printing, directional lighting, and scanning. For example, the optical transmitter may be a VCSEL, laser diode, or an edge-emitting laser. In embodiments where electronic device 160 is a VCSEL, electronic device 160 may be used to optically transmit data signal 112 produced by logic 110. In some embodiments, a VCSEL may reside in a transmitter and may be biased and modulated by compensation signal 162. In this manner, a VCSEL may transmit data signal 112 from logic 110 across an optical medium such as a fiber optic cable. In other embodiments, electronic device 160 may be a non-optical device such as a USB driver or a FPGA driven by current-mode driver 120.

Figure 2:
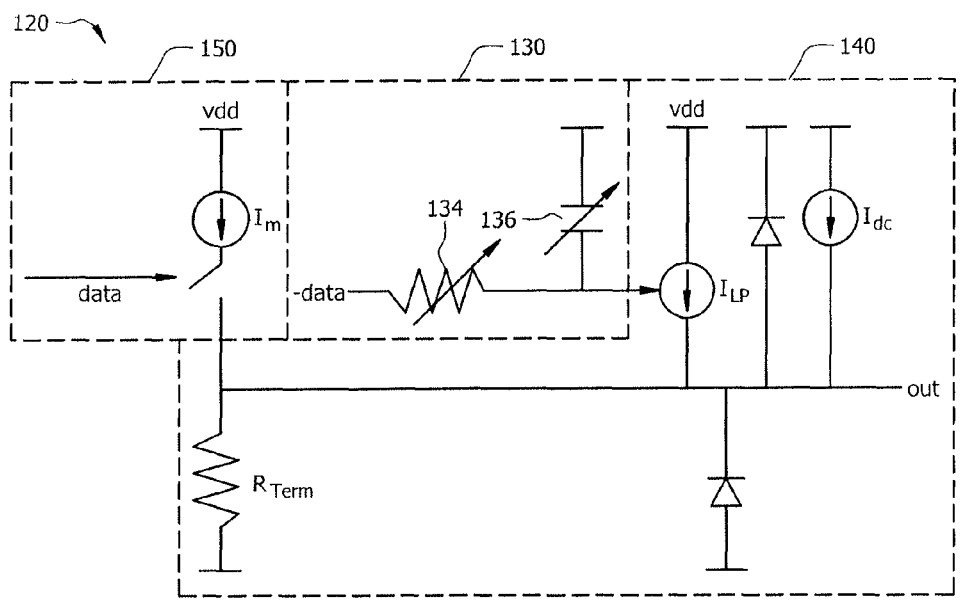
FIG. 2 is a circuit diagram illustrating an example embodiment of a current-mode driver with built-in CTLE.
Figure 3A:
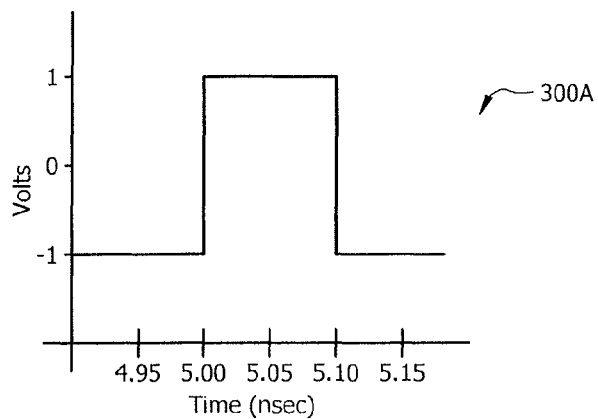
FIGS. 3A-D are illustrating waveforms showing the effects a current-mode driver with built-in CTLE has on data signal.
Figure 3B:
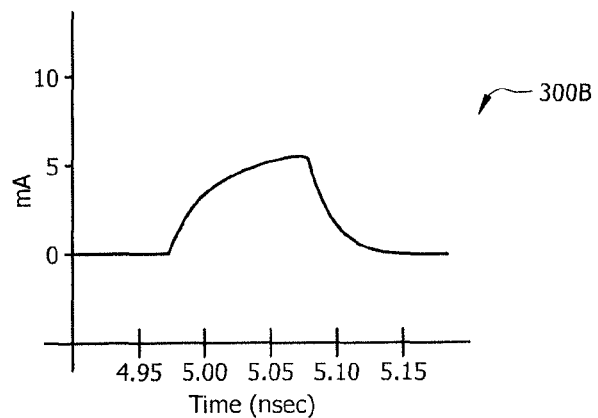
Figure 3C:
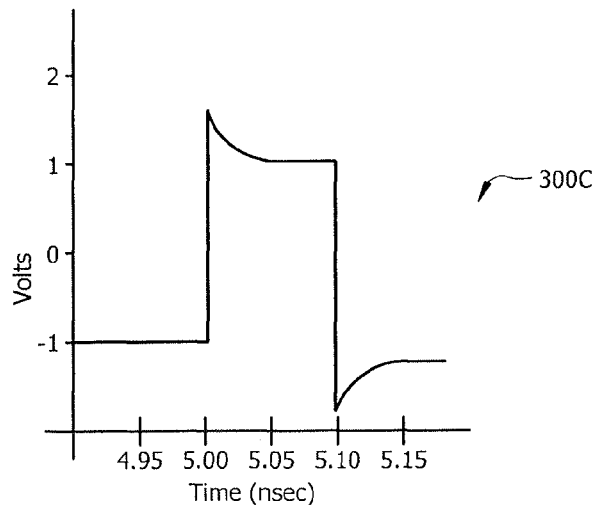
Figure 3D:
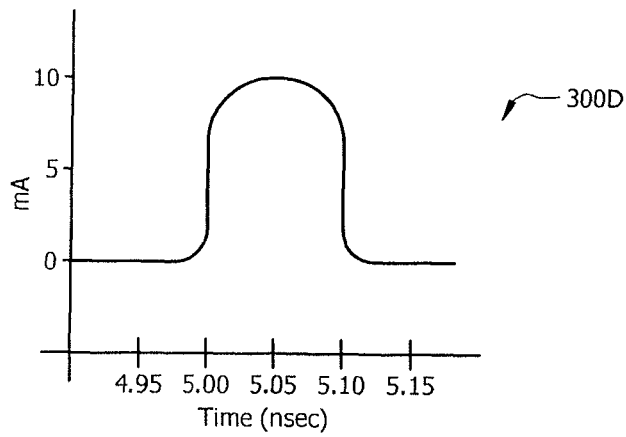

FIG. 2 is a circuit diagram illustrating an example embodiment of a current-mode driver 120 with built-in CTLE. Current-mode driver 120 includes filtering circuit 130, analog current source 140, and digital current source 150. Filtering circuit 130 comprises resistor 134 and capacitor 136. In the illustrated embodiment, filtering circuit 130 is a low-pass RC circuit. In certain embodiments, current-mode driver 120 includes a DC current source, $I_{DC}$, a termination resistor, $R_{Term}$, and one or more electrostatic discharge components (e.g., reverse biased diodes).

Current-mode driver 120 with built-in CTLE may act as a high-pass filter that compensates data signal 112 to overcome the low-pass response created by electronic device 160. Data signal 112 may switch digital current source 150 producing main current signal 152. For example, when data signal 112 is at a logical high (e.g., +5v), the switch may close and digital current source 150 may produce main current signal 152. Digital current source 150 may comprise one or more BJTs, FETs, MOSFETs, or operational amplifiers that use supply voltage $V_{dd}$. The amperage of main current signal 152 may depend on the device being driven. For example, if electronic device 160 is a VCSEL, main current source 152 may be 8 mA.

Filtering circuit 130 may be a series RC filter capable of receiving negative data signal 114 and producing filtered data signal 132. The voltage across the capacitor, may be represented by the equation, $$\frac{1}{1+RCs}V_{in},$$

wherein R is the value of resistor 134 in ohms, C is the value of capacitor 136 in farads, s is the complex frequency, and $V_{in}$ is negative data signal 114 in volts. In certain embodiments, the behavior of current-mode driver 120 with built-in CTLE may be generalized by a transfer function. Depending on the channel characteristics of data transmission system 100, the CTLE transfer function may have one zero and two poles. As an example, the transfer function of current-mode driver 120 with built-in CTLE may be) represented by:

$$\frac{(s+z_1)}{(s+p_1)(s+p_2)}.$$

In certain embodiments the resistor and capacitor may be tuned to produce a zero at the pole frequency of filtering circuit 130 that compensates for signal degradation caused by the PCB and electronic device 160.

In certain embodiments, filtering circuit 130 may comprise a variable resistor and a digitally tuned capacitor. For example, resistor 134 may be a digital potentiometer that can change resistance, based on a digital signal input. Similarly, capacitor 136 may be an electronically variable capacitor. By including an adjustable resistor and capacitor, filtering circuit 130 may adjust the pole and zeros of the CTLE transfer function. The resistor and capacitor may be adjusted based on changes to the circuit such as temperature fluctuations or changes in the frequency of data signal 112.

Analog current source 140 may include any suitable mechanism for producing a current that follows filtered data signal 114. In certain embodiments, current source 140 may be a transconductance amplifier, wherein the output current is proportional to the input voltage. In some embodiments, analog current source 140 may be a cascode amplifier. In the illustrated embodiment, analog current source 140 generates subtraction signal 142 by converting the voltage of filtered data signal 114 into a proportional current that may be combined with main current signal 152 to create compensation signal 122. In this manner, current-mode driver 120 with built-in CTLE may create a high-frequency boost to the rising edge of data signal 112. This transmit equalization may compensate for the low-pass effects caused by electronic device 160.

In certain embodiments, current-mode driver 120 with built-in CTLE may also include a DC current source that is capable of biasing electronic device 160. The current from $I_{dc}$ may be any suitable bias current that may provide a sufficient current to electronic device 160 to allow the device to be modulated. Thus in the illustrated embodiment, compensation signal 122 may be characterized as:

$$I_m - \frac{I_{lp}}{1+RCs} + I_{dc}.$$

To maximize the power transfer between current-mode driver 120 and electronic device 160 and to minimize reflection, current-mode driver 120 may also include a termination resistor $R_{Term}$. The termination resistor may be configured to have an impedance that matches the output impedance of electronic device 160. For example, in embodiments where electronic device 160 is a VCSEL, $R_{Term}$ may have an output impedance of 60Ω to match the 60Ω impedance of the VCSEL. Current-mode driver 120 may also include one or more elements to provide protection against electrostatic discharge (ESD). In the illustrated embodiment, current-mode driver 120 includes ESD diodes to provide ESD protection while minimizing interference with compensation signal 122.

Modifications, additions, or omissions may be made to data transmission system 100 and current-mode driver 120 with built-in CTLE without departing from the scope of the invention. Although FIG. 1 shows an embodiment including logic 110, current-mode driver 120, and electronic device 160, data transmission system 100 may include more or less components. For example, the DC current source may be removed from current-mode driver 120 if electronic device 160 does not need biasing. As another example, current-mode driver 120 may not be implemented as a single, unitary device. In such embodiments, various portions of current mode driver 120 may reside in different portions of system 100. In certain embodiments, the transfer function of current-mode driver 120 with built-in CTLE may contain more than one zero and pole. Any suitable components may perform the functions of system 100.

FIGS. 3A-D are illustrating waveforms showing the effects current-mode driver 120 with built-in CTLE has on data signal 112. Waveform 300A illustrates a bit of data signal 112 as generated by logic 110. In the illustrated embodiment, data signal 112 is a square-wave-type pulse with vertical leading a falling edges and a flat frequency response. Data signal 112 may include a number of logical '0' and '1' bits represented as pulses. Although represented as ranging between negative one and one volts, data signal 112 may have any suitable amplitude and frequency capable of being used by electronic device 160.

Waveform 300B illustrates an example bit of data signal 112 right before being transmitted by electronic device 160. Waveform 300B represents data signal 112 that has not gone through pre-emphasis with current-mode driver 120 with built-in CTLE. The data bit has experienced signal attenuation and degradation caused by the communication channels of the PCB and electronic device 160. Although the bit is supposed to represent a positive data pulse, the data bit instead has sloped leading and trailing edges and unsmooth frequency responses. The amplitude of the pulse is also lower than the original bit in waveform 300A. This degradation of data signal 112 may lead to operational defects in electronic device 160 such as a failure to recognize waveform 300B as a logical '1'. This in turn may cause electronic device 160 to operate erroneously.

Waveform 300C illustrates an example bit of compensation current signal 122 after going through current-mode driver 120 with built-in CTLE. After main current signal 152 combines with subtraction current signal 142, the data bit of compensation current signal 122 produces pre-distortion of the high frequency content of data signal 112 in order to compensate for the future signal attenuation caused by the PCB and electronic device 160. Thus, compensation current signal 122 has a raised leading bit edge. The changes made by current-mode driver 120 to data signal 112 provide pre-emphasis in order to overcome signal degradation and attenuation caused by the PCB and electronic device 160. Although represented as ranging between one and two volts, compensation signal 122 may not be drawn to scale and may have a leading edge pulse with a lower amplitude or a varying width.

Waveform 300D illustrates an example bit of compensation current signal 122 right before being transmitted by electronic device 160. In the illustrated embodiment, compensation current signal 122 went through pre-emphasis with current-mode driver 120 with built-in CTLE. Unlike waveform 300B, the bit of waveform 300D maintains sufficient form to be properly used and transmitted by electronic device 160. Although it still exhibits signs of degradation and attenuation, by first undergoing pre-emphasis, waveform 300D may be used by electronic device 160.

Figure 4:
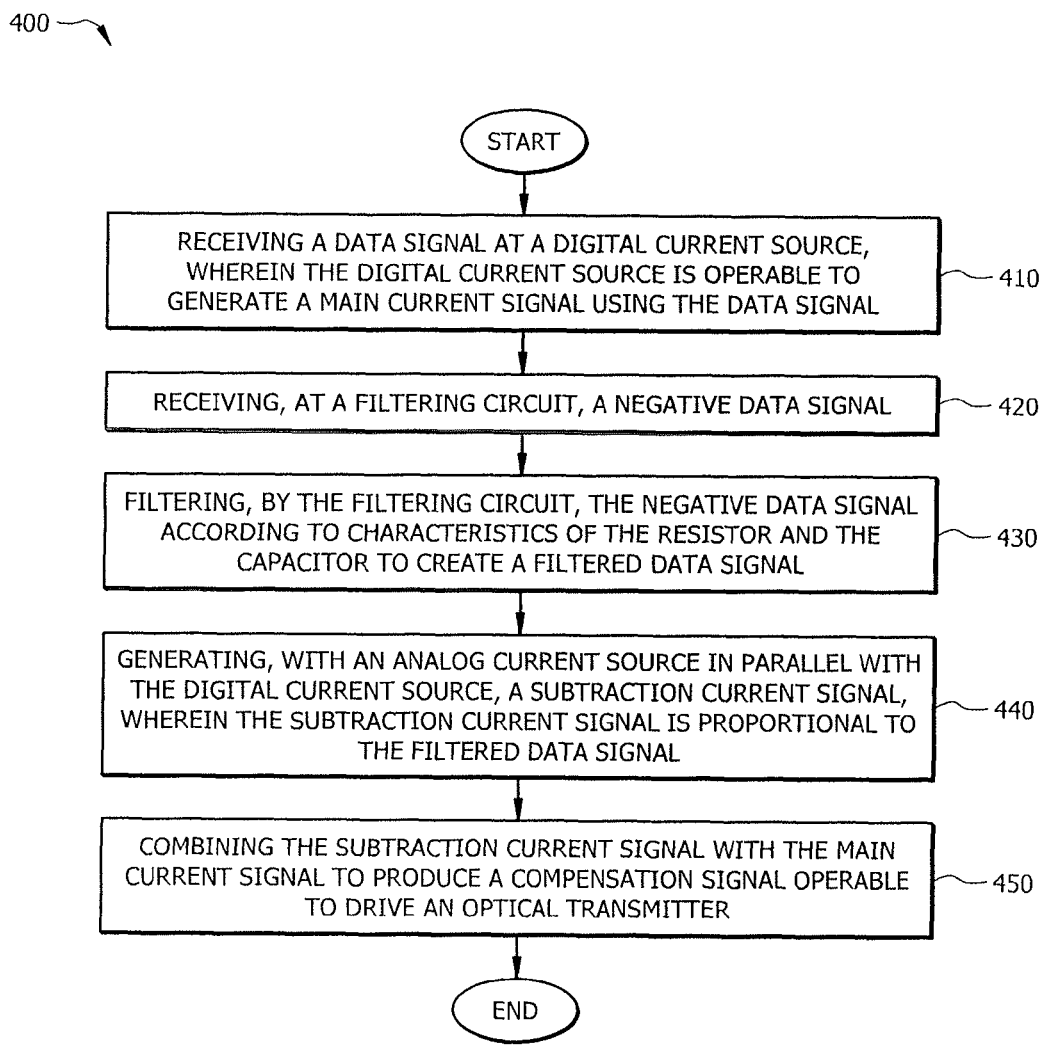
FIG. 4 is a flowchart illustrating a method for using a current-mode driver with built-in CTLE.

FIG. 4 is a flowchart illustrating a method 400 for using current-mode driver 120 with built-in CTLE. At step 410, digital current source 150 receives data signal 112 from logic 110. Data signal 112 may be used to switch digital current source 150. In this manner, digital current source 150 may produce main current signal 152 based on data signal 112.

At step 420, filtering circuit 130 receives negative data signal 114. In certain embodiments, negative data signal 114 is the negative version of data signal 112. At step 430, filtering circuit 130 filters the negative data signal according to characteristics of resistor 134 and capacitor 136 to create filtered data signal 132. In certain embodiments, resistor 134 and capacitor 136 may be tuned to produce a zero at the pole frequency of filtering circuit 130 that compensates for signal degradation caused by the PCB and electronic device 160.

At step 440, analog current source 140, generates subtraction current signal 142 based on filtered data signal 132. In certain embodiments, analog current source 140 uses the voltage signal of filtered data signal 132 to generate a proportional current signal.

At step 450, subtraction current signal 142 combines with main current signal 152 to create compensation signal 122. Compensation signal 122 may be used to drive electronic device 160. Accordingly, current-mode driver 120 with built-in CTLE may provide pre-emphasis to data signal 112 by boosting the high-frequency leading edge of bit transitions in data signal 112 in order to overcome the low-pass losses created by electronic device 160.

Various embodiments may perform some, all, or none of the steps described in method 400 above. For example, the resistor and capacitor of filtering circuit 130 may be a variable resistor and a variable capacitor. In embodiments having a variable resistor and capacitor, filtering circuit 120 may dynamically be tuned in order to respond to changes in the drive circuit such as temperature changes in electronic device 160 or frequency changes in data signal 112. Although discussed as current-mode driver 120 performing these steps, any suitable component of data transmission system 100 may perform one or more steps of the method.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:

1. A current-mode driver with built-in continuous-time linear equalization (CTLE) for a transmitter, comprising:
a digital current source operable to use a data signal to produce a main current signal;
a filtering circuit comprising a resistor and a capacitor, the filtering circuit operable to receive a negative data signal and produce a filtered data signal, wherein the filtering circuit is tuned to produce a zero at a pole frequency in the filtered data signal that compensates for signal degradation caused by an optical transmitter; and
an analog current source coupled in parallel to the digital current source, wherein the analog current source is operable to generate a subtraction current signal proportional to the filtered data signal, the subtraction current signal combined with the main current signal are operable to drive the transmitter.

2. The current-mode driver of claim 1, wherein the transmitter is a vertical-cavity surface-emitting laser (VCSEL).

3. The current-mode driver of claim 2, further comprising:
a DC current source in parallel with the digital current source and the analog current source, wherein the DC current source is operable to bias the VCSEL; and
a termination resistor coupled to the digital current source and the analog current source, the termination resistor operable to maximize the power transfer between the current-mode driver and the VCSEL.

4. The current-mode driver of claim 1, wherein the resistor is a variable resistor and the capacitor is a variable capacitor.

5. The current-mode driver of claim 4, wherein the variable resistor and variable capacitor are dynamically tuned in response to temperature changes in the transmitter.

6. The current-mode driver of claim 4, wherein the variable resistor and variable capacitor are dynamically tuned in response to frequency changes in the data signal.

7. A method comprising:
receiving a data signal at a digital current source, wherein the digital current source is operable to use the data signal to produce a main current signal;
receiving, at a filtering circuit, a negative data signal, wherein the filtering signal comprises a resistor and a capacitor;
filtering, by the filtering circuit, the negative data signal according to characteristics of the resistor and the capacitor to create a filtered data signal;
generating, with an analog current source in parallel with the digital current source, a subtraction current signal, wherein the subtraction current signal is proportional to the filtered data signal; combining the subtraction current signal with the main current signal to produce a compensation signal operable to drive a transmitter;
wherein the filtering circuit is tuned to produce a zero at a pole frequency of the filtering circuit that compensates for bandwidth limitations of the transmitter.

8. The method of claim 7, wherein the transmitter is a vertical-cavity surface-emitting laser (VCSEL).

9. The method of claim 8, further comprising:
biasing the transmitter with a DC current source that is in parallel with the analog current source and the digital current source.

10. The method of claim 7, wherein the resistor and the capacitor are operable to create a low-pass filter.

11. The method of claim 7, wherein the resistor is a variable resistor and the capacitor is a variable capacitor.

12. The method of claim 11, wherein the variable resistor and variable capacitor are dynamically tuned in response to temperature changes in the transmitter.

13. An apparatus comprising:
a digital current source operable to use a data signal to produce a main current signal;
a filtering circuit comprising a resistor and a capacitor, wherein the filtering circuit receives a negative data signal and generates a filtered data signal according to characteristics of the resistor and capacitor; and
an analog current source coupled in parallel to the digital current source, wherein the analog current source is operable to generate a subtraction current signal proportional to the filtered data signal, the subtraction current signal combined with the main current signal are operable to drive a transmitter;

wherein the filtering circuit is tuned to produce a zero at a pole frequency of the filtering circuit that compensates for signal degradation cause caused by the transmitter.

14. The apparatus of claim 13, wherein the transmitter is a vertical-cavity surface-emitting laser (VCSEL).

15. The apparatus of claim 14, further comprising:
a DC current source coupled to the digital current source and the analog current source, wherein the DC current source is configured to bias the VCSEL; and
a termination resistor coupled to the output of the analog current source and DC current source.

16. The apparatus of claim 13, wherein the resistor and the capacitor are configured to create a low-pass filter.

17. The apparatus of claim 13, wherein the resistor is a variable resistor and the capacitor is a variable capacitor.

18. The apparatus of claim 17, wherein the variable resistor and variable capacitor are dynamically tuned in response to temperature changes in the transmitter.

* * * * *